United States Patent
Chiba et al.

(10) Patent No.: US 9,546,697 B2
(45) Date of Patent: Jan. 17, 2017

(54) VEHICLE POWER TRANSMISSION SYSTEM

(71) Applicant: Kabushiki Kaisha F. C. C., Shizuoka (JP)

(72) Inventors: Ryohei Chiba, Shizuoka (JP); Shouji Makita, Shizuoka (JP); Kaoru Iida, Shizuoka (JP); Makoto Sato, Shizuoka (JP); Kazuyoshi Miyachi, Shizuoka (JP)

(73) Assignee: KABUSHIKI KAISHA F. C. C., Shizuoka (JP)

(*) Notice: Subject to any disclaimer, the term of this patent is extended or adjusted under 35 U.S.C. 154(b) by 0 days.

(21) Appl. No.: 15/137,738

(22) Filed: Apr. 25, 2016

(65) Prior Publication Data
US 2016/0333943 A1 Nov. 17, 2016

(30) Foreign Application Priority Data

May 12, 2015 (JP) .................. 2015-097106

(51) Int. Cl.
| *F16H 61/30* | (2006.01) |
| *F16D 13/52* | (2006.01) |
| *F16H 3/091* | (2006.01) |
| *F16H 63/30* | (2006.01) |
| *F16H 61/02* | (2006.01) |

(52) U.S. Cl.
CPC ............... *F16D 13/52* (2013.01); *F16H 3/091* (2013.01); *F16H 61/0204* (2013.01); *F16H 63/30* (2013.01); *F16H 2063/3093* (2013.01)

(58) Field of Classification Search
CPC .......... F16D 13/52; F16D 13/54; F16D 13/56; F16H 61/0204; F16H 63/30; F16H 3/091; F16H 2063/3093
See application file for complete search history.

(56) References Cited

U.S. PATENT DOCUMENTS

| 2,208,111 | A | | 7/1940 | Backstrom | |
| 5,617,938 | A | * | 4/1997 | Tsukada | .................. F16D 13/52 192/54.5 |
| 5,678,674 | A | | 10/1997 | Nehse | |
| 2008/0308382 | A1 | * | 12/2008 | Kataoka | .................. F16D 13/56 192/93 R |

(Continued)

FOREIGN PATENT DOCUMENTS

| EP | 0730105 A2 | 9/1996 |
| EP | 2105623 A2 | 9/2009 |

(Continued)

OTHER PUBLICATIONS

European Search Report dated Oct. 24, 2016 issued in European Patent Application No. 16167073.2, pp. 1-9.

*Primary Examiner* — Ramya Burgess
*Assistant Examiner* — Lillian Nguyen
(74) *Attorney, Agent, or Firm* — Polsinelli PC

(57) ABSTRACT

A vehicle power transmission system includes a clutch having a friction plate, a clutch plate, and a pressure plate for elastically pressing the friction plate or the clutch plate by a pressure elastic body, a clutch actuator that applies a clutch OFF pressing force to the pressure plate, and a control device. When causing the clutch to shift to a clutch ON state, the control device controls operation of the clutch actuator to make the clutch OFF pressing force less than an elastic force of the pressure elastic body and apply an anti-assist force to the pressure plate.

8 Claims, 5 Drawing Sheets

(56) References Cited

U.S. PATENT DOCUMENTS

2009/0127057 A1  5/2009  Inomori et al.
2010/0107810 A1* 5/2010  Saitoh .................... F16H 3/006
                                                 74/664
2014/0326570 A1  11/2014 Isobe et al.

FOREIGN PATENT DOCUMENTS

GB           508088 A    6/1939
JP      2010-038182 A    2/2010
JP      2013-137039 A    7/2013

* cited by examiner

VEHICLE POWER TRANSMISSION SYSTEM

CROSS-REFERENCE TO RELATED APPLICATION

This application claims priority from Japanese Patent Application No. 2015-097106 filed with the Japan Patent Office on May 12, 2015, the entire content of which is hereby incorporated by reference.

BACKGROUND

1. Technical Field

The present disclosure relates to a vehicle power transmission system.

2. Description of the Related Art

Some self-propelled vehicles such as motorcycles and four-wheeled drive buggy cars are conventionally provided with a power transmission device to transmit a driving force generated by an engine (motor) to a drive wheel. The power transmission device is a machine that changes the rotational speed of a crankshaft of the engine and transmits it to the drive wheel while connecting to and disconnecting from the crankshaft. The power transmission device mainly includes a clutch and a transmission.

The clutch here is a machine that transmits a rotational driving force of the crankshaft of the engine to the transmission side while connecting to and disconnecting from the crankshaft. Moreover, the transmission is a machine that has a plurality of gear stages with combinations of a plurality of gears, and changes the rotational speed of the crankshaft of the engine by a selected gear stage to transmit the rotational speed to the drive wheel side.

In this case, a clutch is described in, for example, JP-A-2013-137039. The clutch described in this document includes a clutch member (clutch hub) that holds a driven-side clutch plate (clutch plate), and a pressure member (pressure plate). The pressure member is placed facing the clutch member to press a drive-side clutch plate (friction plate). A pressure assist cam is provided on an opposing surface of each of the driven-side clutch plate and the pressure member.

The pressure assist cam is an assist mechanism including a clutch member-side first cam surface (hub-side cam portion) and a pressure-side first cam surface (pressure-side cam portion). The clutch member-side first cam surface and the pressure-side first cam surface each include an inclined surface for generating an assist force that increases a pressing force between the drive-side clutch plate and the driven-side clutch plate when a relative rotation is generated between the clutch member and the pressure member upon the clutch shifting to a state where the driving force of the engine is transmitted. Consequently, in the power transmission device described in JP-A-2013-137039, the assist force by the assist mechanism causes the drive-side clutch plate and the driven-side clutch plate to press each other early to shift the clutch to the state where the driving force is transmitted. Furthermore, vibrations from the engine and the like can be prevented from being transmitted to a clutch lever.

SUMMARY

A vehicle power transmission system includes: a transmission for transmitting a driving force of an engine mounted in a vehicle to a drive wheel of the vehicle while changing a rotational speed; a clutch for transmitting or shutting off the driving force transmitted from the engine to or from the transmission, the clutch including a clutch hub for holding a clutch plate placed facing a friction plate to be rotationally driven by the driving force transmitted from the engine and for transmitting the driving force to the transmission and a pressure plate placed adjacently to the clutch hub so as to be approachable to and separable from and relatively rotatable with respect to the clutch hub, the pressure plate elastically pressing the friction plate or the clutch plate by a pressure elastic body; a hub-side assist cam portion and a pressure-side assist cam portion included in the clutch hub and the pressure plate of the clutch respectively, the hub-side assist cam portion and the pressure-side assist cam portion each including an inclined surface for generating an assist force to increase a pressing force between the friction plate and the clutch plate upon generation of a relative rotation between the clutch hub and the pressure plate when the clutch shifts to a state where the driving force is transmitted; a clutch actuator for applying, to the pressure plate, a clutch OFF pressing force to separate the pressure plate from the friction plate or the clutch plate against an elastic force of the pressure elastic body in order to put the clutch in a state where the driving force is shut off; and a control device for controlling operation of the clutch actuator and controlling the transmission and shutting off of the driving force in the clutch, the control device, when the clutch is caused to shift to the state where the driving force is transmitted, controlling the operation of the clutch actuator to make the clutch OFF pressing force to be applied to the pressure plate less than the elastic force of the pressure elastic body and apply, to the pressure plate, an anti-assist force being less than the assist force against the assist force, in order to suppress the increase of the assist force.

BRIEF DESCRIPTION OF THE DRAWINGS

FIG. 4A is a partial cross-sectional view illustrating a manner in which an assist function is exerted, and FIG. 4B is a partial cross-sectional view illustrating a manner in which a slipper function is exerted.

DESCRIPTION OF THE EMBODIMENTS

Figure 1:
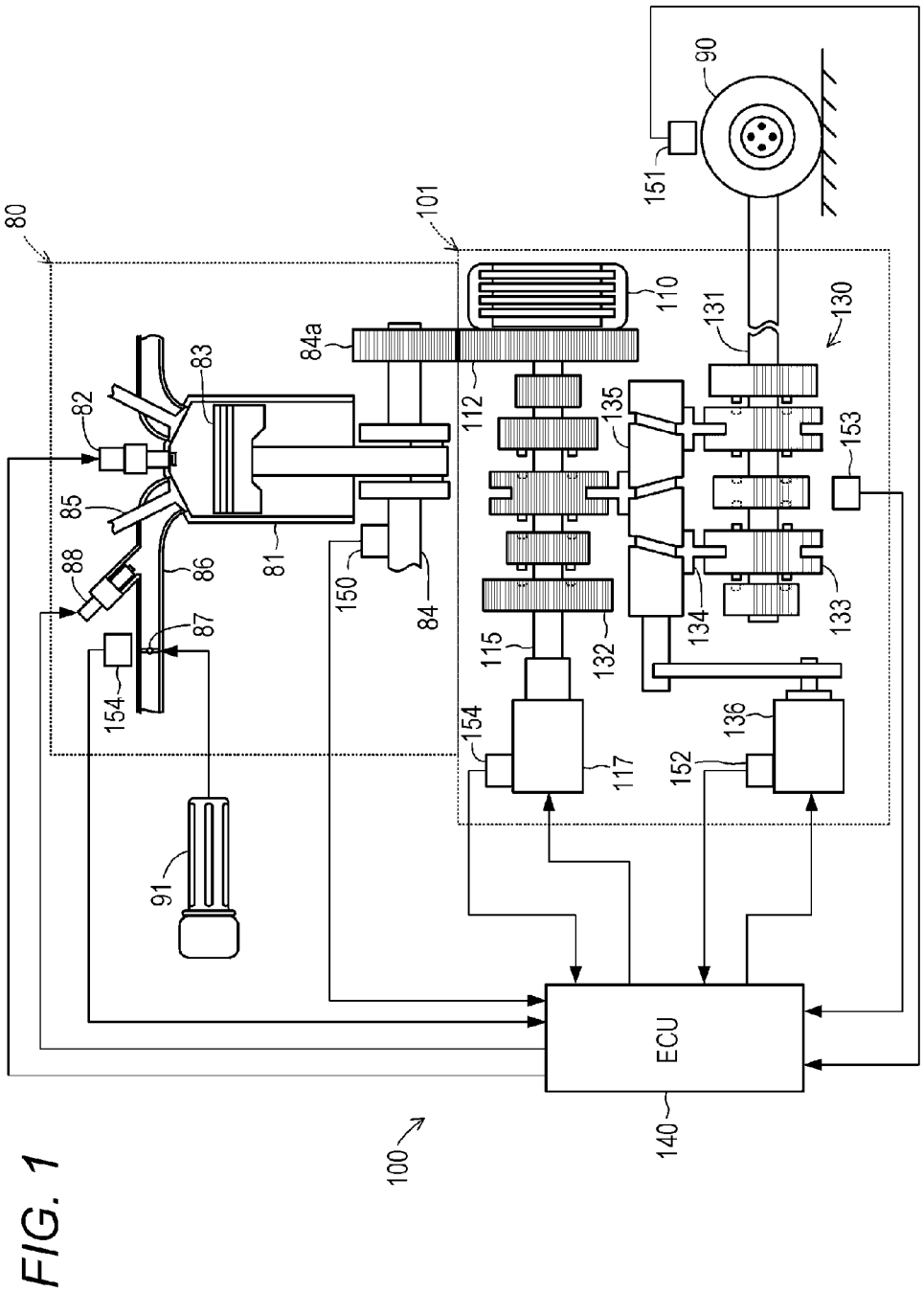
FIG. 1 is a block diagram schematically illustrating an outline of the entire configuration of a vehicle power transmission system according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the power transmission device described in JP-A-2013-137039, when a driver of the vehicle manually operates the clutch lever, the assist mechanism causes the clutch to enter the state where the driving force is transmitted earlier than intended by the driver. Hence, the driver may feel uncomfortable.

One object of the present disclosure is to provide a vehicle power transmission system such as follows: this system can suppress an uncomfortable feeling that a driver of a vehicle will have, by shifting a clutch including an assist mechanism smoothly to a state where a driving force is transmitted.

A vehicle power transmission system according to one aspect of the present disclosure (the present system) includes: a transmission for transmitting a driving force of an engine mounted in a vehicle to a drive wheel of the vehicle while changing a rotational speed; a clutch for transmitting or shutting off the driving force transmitted from the engine to or from the transmission, the clutch including a clutch hub for holding a clutch plate placed facing a friction plate to be rotationally driven by the driving force transmitted from the engine and for transmitting the driving force to the transmission and a pressure plate placed adjacently to the clutch hub so as to be approachable to and separable from and relatively rotatable with respect to the clutch hub, the pressure plate elastically pressing the friction plate or the clutch plate by a pressure elastic body; a hub-side assist cam portion and a pressure-side assist cam portion included in the clutch hub and the pressure plate of the clutch respectively, the hub-side assist cam portion and the pressure-side assist cam portion each including an inclined surface for generating an assist force to increase a pressing force between the friction plate and the clutch plate upon generation of a relative rotation between the clutch hub and the pressure plate when the clutch shifts to a state where the driving force is transmitted; a clutch actuator for applying, to the pressure plate, a clutch OFF pressing force to separate the pressure plate from the friction plate or the clutch plate against an elastic force of the pressure elastic body in order to put the clutch in a state where the driving force is shut off; and a control device for controlling operation of the clutch actuator and controlling the transmission and shutting off of the driving force in the clutch, the control device, when the clutch is caused to shift to the state where the driving force is transmitted, controlling the operation of the clutch actuator to make the clutch OFF pressing force to be applied to the pressure plate less than the elastic force of the pressure elastic body and apply, to the pressure plate, an anti-assist force being less than the assist force against the assist force, in order to suppress the increase of the assist force.

The present system having such a configuration includes the clutch actuator and the control device that controls the operation of the clutch actuator. The clutch actuator shifts the clutch to, for example, a clutch ON state being the state where the driving force is transmitted, a half clutch state, or a clutch OFF state being the state where the driving force is shut off. The control device controls the operation of the clutch actuator and makes the clutch OFF pressing force applied to the pressure plate less than the elastic force of the pressure elastic body. Furthermore, the control device controls the operation of the clutch actuator and applies, to the pressure plate, the anti-assist force against the assist force, the anti-assist force being less than the assist force. Consequently, the control device suppresses the increase of the assist force. Accordingly, in the present system, the clutch shifts to the clutch ON state more slowly and smoothly than in the known technology. Hence, the driver can drive the vehicle without feeling uncomfortable.

Moreover, in the present system, the control device may control the operation of the clutch actuator and apply the anti-assist force to the pressure plate before the clutch enters the half clutch state. In this case, the half clutch state is a state of the clutch before the friction plate and the clutch plate come fully into close contact with each other. The transmission state in the half clutch state is an incomplete transmission state where part of the rotational driving force of the engine is transmitted to the drive wheel side.

According to this configuration, in the present system, the control device controls the operation of the clutch actuator and applies the anti-assist force to the pressure plate before the clutch enters the half clutch state to suppress the increase of the assist force. In other words, in this configuration, the control device controls the operation of the clutch actuator and generates the anti-assist force against the assist force in advance. Hence, the increase of the assist force can be suppressed from the start of the generation of the assist force. Consequently, it is possible to shift the clutch to the clutch ON state slowly and smoothly. As a result, the driver can drive the vehicle without feeling uncomfortable.

Moreover, in the present system, the control device may control the operation of the clutch actuator and apply, to the pressure plate, the anti-assist force oriented toward the assist force after the assist force is generated and before the assist force reaches its maximum value.

According to this configuration, in the present system, the control device controls the operation of the clutch actuator and applies, to the pressure plate, the anti-assist force oriented toward the assist force after the assist force is generated and before the assist force reaches its maximum value. Hence, a large increase of the assist force can be suppressed with more certainty. Consequently, it is possible to slowly shift the clutch to the clutch ON state. As a result, the driver can drive the vehicle without feeling uncomfortable.

Moreover, in the present system, the control device may control the operation of the clutch actuator and apply the anti-assist force to the pressure plate at a midpoint between after the assist force is generated and before the assist force reaches its maximum value.

According to this configuration, in the present system, the control device controls the operation of the clutch actuator and applies the anti-assist force to the pressure plate at the midpoint of the assist force working time between after the assist force is generated and before the assist force reaches its maximum value. Hence, a large anti-assist force corresponding to a displacement toward the clutch OFF side is not generated in the first half of the assist force working time, which is immediately after the assist force is generated. Hence, it is possible to smoothly shift the clutch to the clutch ON state. As a result, the driver can drive the vehicle without feeling uncomfortable.

Moreover, in the present system, the control device may control the operation of the clutch actuator and increase the anti-assist force applied to the pressure plate over time.

According to this configuration, in the present system, the control device controls the operation of the clutch actuator and increases the anti-assist force applied to the pressure plate over time. Hence, the control device can increase the anti-assist force in accordance with the increase of the assist force. Consequently, the control device can increase the driving force transmitted to the transmission at a constant rate. As a result, the control device can suppress sudden transmission of the driving force to the transmission.

Moreover, in the present system, the control device may control the operation of the clutch actuator and continue applying the anti-assist force to the pressure plate until the clutch shifts to the clutch ON state where the driving force is completely transmitted to the transmission.

According to this configuration, in the present system, the control device controls the operation of the clutch actuator and continues applying the anti-assist force to the pressure plate until the clutch shifts to the clutch ON state where the driving force is completely transmitted to the transmission. Hence, the clutch smoothly shifts to the clutch ON state. As a result, the driver can drive the car without feeling uncomfortable.

A vehicle power transmission system according to one embodiment of the present disclosure will be described below with reference to the drawings. FIG. 1 is a block diagram schematically illustrating an outline of the entire configuration of a vehicle power transmission system 100 according to the embodiment.

The drawings referred to in the specification are schematically illustrated by, for example, illustrating a part of components exaggeratedly for the purpose of facilitating the understanding of the technology of the present disclosure. Hence, in terms of the dimensions, ratios, and the like between components, there may be differences between the real components and the illustrated components.

The vehicle power transmission system 100 is a group of machines that transmit, to a drive wheel 90, a rotational driving force generated by an engine 80 being a motor of a two-wheeled motor vehicle (what is called a motorcycle). The vehicle power transmission system 100 is provided near the engine 80 in the two-wheeled motor vehicle (for example, below a seat or fuel tank).

The engine 80 here is a motor that is mounted on a two-wheeled motor vehicle (not illustrated) to generate a rotational driving force by combustion of fuel. The engine 80 is what is called a reciprocating engine. Specifically, in the engine 80, a mixture including fuel and air is introduced into a cylinder 81 formed into a tube. The mixture is ignited by an ignition plug 82 and exploded to cause a piston 83 to make reciprocating motion in the cylinder 81. Consequently, a rotational driving force is generated on a crankshaft 84 coupled to the piston 83. The rotational driving force of the crankshaft 84 is transmitted to a clutch 110 via a primary drive gear 84a attached to an end of the crankshaft 84. In the embodiment, the engine 80 is assumed to be what is called a four-stroke engine. However, as a matter of fact, the engine 80 may be what is called a two-stroke engine. Moreover, in the embodiment, the engine 80 is assumed to be a three-cylinder engine provided with three cylinders 81. However, as a matter of fact, the engine 80 may be an engine with four or more cylinders.

The cylinder 81 constituting a combustion chamber in the engine 80 is connected to an intake pipe 86 via an intake valve 85. The intake pipe 86 is a pipe for supplying the mixture into the cylinder 81. The intake pipe 86 includes a throttle valve 87 that adjusts the amount of air to be supplied into the cylinder 81, and an injector 88 that supplies (injects) a spray of the fuel into the cylinder 81. Among the members of the engine 80 described above, the operation of the ignition plug 82 and the injector 88 is controlled by an ECU 140 described below. Moreover, a driver of the vehicle manually operates an accelerator grip 91 to operate the throttle valve 87.

(The Configuration of the Vehicle Power Transmission System 100)

The vehicle power transmission system 100 includes a power transmission device 101. The power transmission device 101 is a machine that includes a plurality of gear stages having gear ratios different from each other. The power transmission device 101 changes, by a selected gear stage, the rotational driving force generated by the engine 80 and transmits the rotational driving force. The power transmission device 101 is configured mainly of the clutch 110 and a transmission 130.

The clutch 110 is placed between the engine 80 and the transmission 130 on a transmission path of the rotational driving force generated by the engine 80. The clutch 110 is a machine for transmitting and shutting off the rotational driving force generated by the engine 80 to and from the transmission 130. Specifically, the clutch 110 is provided on one end side (the right-hand side of the illustration) of a main shaft 115 extending like a rod from the transmission 130 as illustrated in FIGS. 2 and 3.

Figure 2:
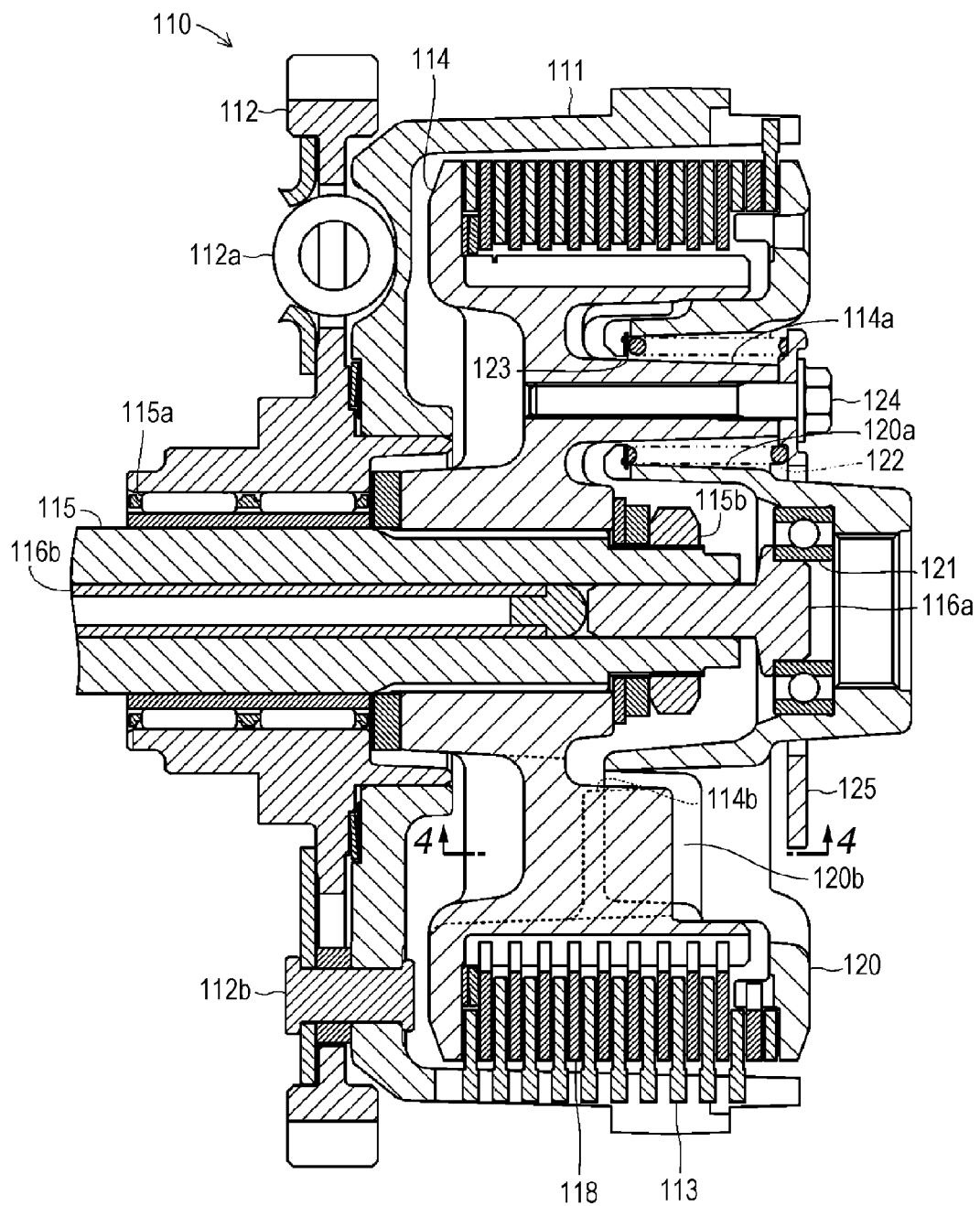
FIG. 2 is a cross-sectional view illustrating an outline of the entire configuration of a clutch in a power transmission device illustrated in FIG. 1.
Figure 3:
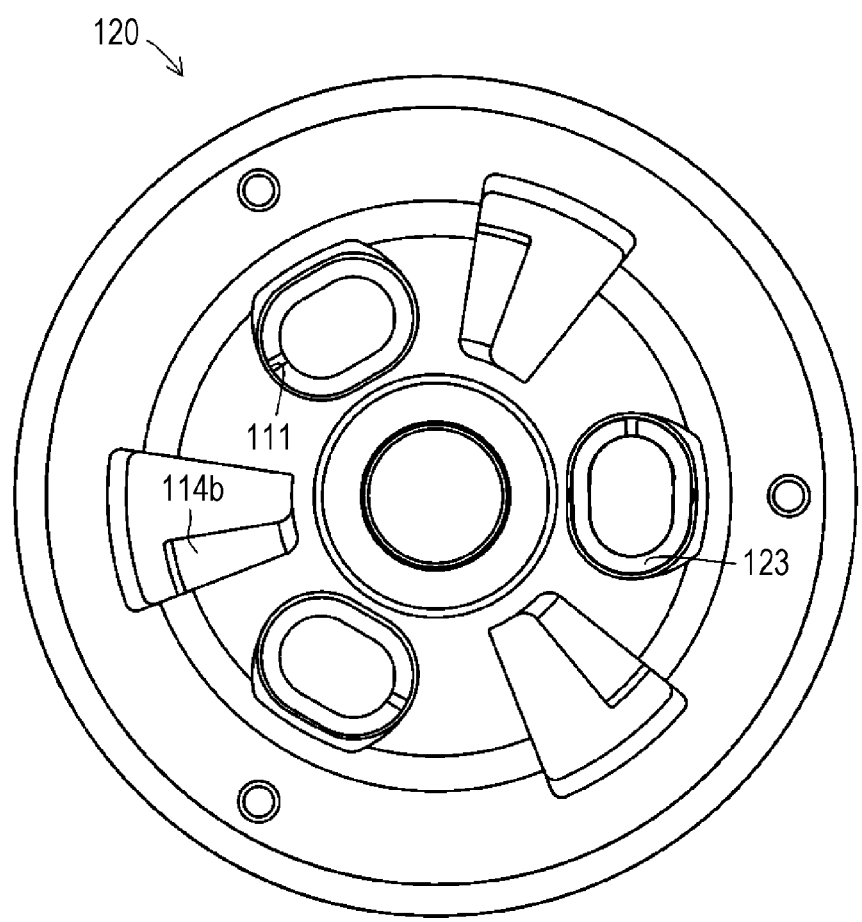
FIG. 3 is a plan view illustrating an outline of an external configuration of a pressure plate assembled in the clutch illustrated in FIG. 2 when viewed from the right-hand side in FIG. 2 to illustrate the relationship between the pressure plate and a hub-side assist cam portion in a clutch hub.

As illustrated in FIG. 2, the clutch 110 includes a clutch housing 111 made of an aluminum alloy. The clutch housing 111 is a member that is formed into a cylinder with a bottom, and is a part of a housing of the clutch 110. A primary driven gear 112 is fixed by a rivet 112b to a left side surface of the clutch housing 111 in the illustration via a torque damper 112a. The primary driven gear 112 is engaged with the primary drive gear 84a integrally coupled with the crankshaft 84 that is rotationally driven by the drive of the engine 80, and is rotationally driven (refer to FIG. 1). An inner peripheral surface of the clutch housing 111 holds a plurality of friction plates 113 by spline fitting so as to be displaceable along the direction of the axis of the clutch housing 111 and be rotatable integrally with the clutch housing 111.

The friction plate 113 is a flat ring-shaped component that is pressed against a clutch plate 118 described below. The friction plate 113 is formed by stamping a thin plate material formed of an SPCC (cold rolled steel) material into a ring shape. A clutch hub 114 formed into a substantially flange shape is placed coaxially with the clutch housing 111 in the clutch housing 111. A plurality of spline grooves is formed along the direction of the axis of the clutch hub 114 on an inner peripheral surface of the clutch hub 114. The main shaft 115 is spline-fitted into the spline grooves.

The main shaft 115 is a shaft body formed into a hollow shape. One end side (the right-hand side of the illustration) (refer to FIGS. 1 and 2) of the main shaft 115 rotatably supports the primary driven gear 112 and the clutch housing 111 via a needle bearing 115a. Furthermore, the end side of the main shaft 115 fixedly supports the clutch hub 114 spline-fitted into the clutch housing 111 via a nut 115b. In other words, the clutch hub 114 rotates integrally with the main shaft 115. On the other hand, the other end side (the left-hand side of the illustration) of the main shaft 115 is coupled to the transmission 130.

The one end side (the right-hand side) of the hollow portion of the main shaft 115 is provided with a push member 116a. Furthermore, a push rod 116b is provided adjacent to the push member 116a so as to extend in the direction of the axis of the main shaft 115. Of these, the push member 116a is a rod-like member extending along the direction of the axis of the main shaft 115. One end (the left-hand side of the illustration) of the push member 116a is slidably fitted into the hollow portion of the main shaft 115. The other end (the right-hand side of the illustration) of the push member 116a is coupled to a release bearing 121 provided to a pressure plate 120.

One end side (the left-hand side of the illustration) of the push rod 116b is coupled to a clutch actuator 117 (refer to FIG. 1) through the inside of the main shaft 115. The other end (the right-hand side of the illustration) of the push rod 116b presses the push member 116a. The clutch actuator 117 is a motor that displaces the push rod 116b reciprocatingly along the axial direction in the main shaft 115 via a hydraulic mechanism (not illustrated) to increase and decrease the force of pushing the push member 116a. The clutch actuator 117 includes an electric motor whose operation is controlled by the ECU 140.

In this case, the ECU 140 controls the operation of the clutch actuator 117 by PWM (Pulse Width Modulation) control. The PWM control here is control that changes the duty cycle of a pulse wave for the clutch actuator 117.

A plurality of the clutch plates 118 is placed on an outer peripheral surface of the clutch hub 114 so as to sandwich the friction plates 113. These clutch plates 118 are held by the clutch hub 114 by spline fitting so as to be displaceable along the direction of the axis of the clutch hub 114 and be rotatable integrally with the clutch hub 114. The clutch plate 118 is a flat, ring-shaped component that is pressed against the friction plate 113. The clutch plate 118 is formed by stamping a thin plate material formed of an SPCC (cold rolled steel) material into a ring shape. An internal spline for being spline-fitted with the clutch hub 114 is formed on an inner peripheral portion of the clutch plate 118.

On the other hand, three tubular support columns 114a, three hub-side assist cam portions 114b, and three hub-side slipper cam portions 114c are formed, protruding toward the pressure plate 120 (the right-hand side of the illustration), inside the clutch hub 114. Among these, the three tubular support columns 114a are cylindrical portions extending in a columnar form to support the pressure plate 120. A female screw is formed on an inner peripheral portion of the tubular support column 114a.

Figure 4A:
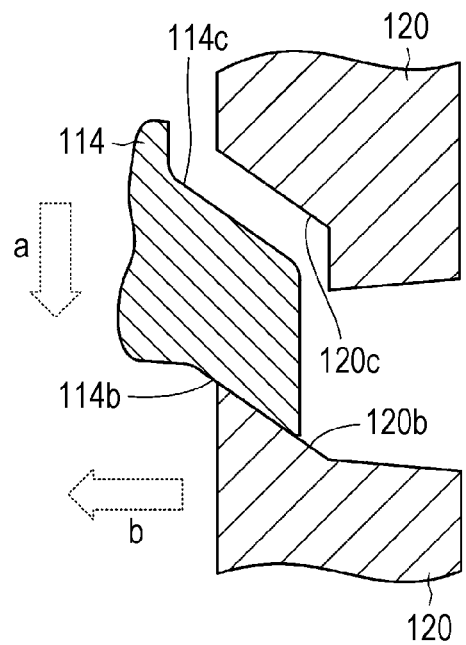
FIGS. 4A and 4B illustrate only main parts of the hub-side assist cam portion, a hub-side slipper cam portion, a pressure-side assist cam portion, and a pressure-side slipper cam portion when viewed from the line 4-4 illustrated in FIG. 2 to explain the operating states of an assist mechanism and a slipper mechanism.

The three hub-side assist cam portions 114b are portions for generating an assist force that increases a pressing force between the friction plate 113 and the clutch plate 118 in cooperation with pressure-side assist cam portions 120b described below. As illustrated in FIG. 4A, the hub-side assist cam portion 114b has an inclined surface gradually protruding toward the pressure plate 120 (the right-hand side of the illustration) along the direction of the circumference of the clutch hub 114. In this case, the three hub-side assist cam portions 114b are respectively formed in spaces between the three tubular support columns 114a.

Figure 4B:
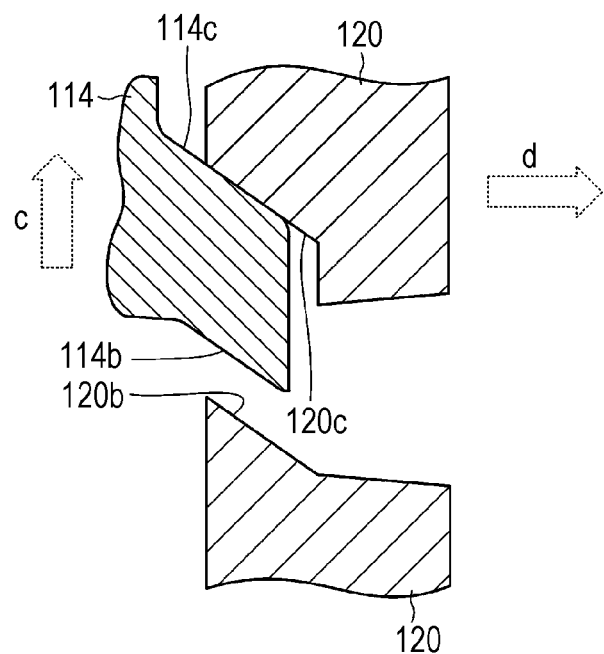

On the other hand, the three hub-side slipper cam portions 114c are portions for separating the friction plates 113 and the clutch plates 118 early in cooperation with pressure-side slipper cam portions 120c described below as illustrated in FIG. 4B to shift the clutch 110 into a half clutch state. The hub-side slipper cam portion 114c has an inclined surface inclined in the same direction as the hub-side assist cam portion 114b, on the opposite side in the circumferential direction from the hub-side assist cam portion 114b. In FIG. 2, one of the three hub-side assist cam portions 114b is indicated by a broken line. Moreover, the half clutch state is a state of the clutch 110 before the friction plate 113 and the clutch plate 118 come fully into close contact with each other. The transmission state in the half clutch state is an incomplete state where part of the rotational driving force of the engine 80 is transmitted to the drive wheel 90 side.

The pressure plate 120 is a component that presses the friction plate 113 to bring the friction plate 113 and the clutch plate 118 into close contact with each other. The pressure plate 120 is configured by forming an aluminum material into a substantially disc shape with substantially the same outer diameter as the outer diameter of the clutch plate 118. Three tubular accommodation portions 120a, three pressure-side assist cam portions 120b, and three pressure-side slipper cam portions 120c are formed, jutting out toward the clutch hub 114 (the left-hand side of the illustration), on the disc surface of the pressure plate 120.

Among these, the three tubular accommodation portions 120a are portions in each of which the tubular support column 114a and a clutch spring 122 are accommodated. The tubular accommodation portion 120a is formed into a long hole extending in the circumferential direction. More specifically, the tubular support column 114a of the clutch hub 114 is placed so as to penetrate in the tubular accommodation portion 120a. Furthermore, the clutch spring 122 and a spring sheet 123 are placed outside the tubular support column 114a. The clutch spring 122 is an elastic body that is placed in the tubular accommodation portion 120a, and exerts an elastic force for pressing the pressure plate 120 toward the clutch hub 114. The clutch spring 122 is configured of a coil spring obtained by winding a spring steel into a spiral. In other words, the clutch spring 122 corresponds to an example of the pressure elastic body according to the present disclosure. The spring sheet 123 is a plate-shaped component placed between a bottom portion of the tubular accommodation portion 120a and the clutch spring 122. The spring sheet 123 is a metal plate formed into a C shape in plan view with respect to the bottom portion of the tubular accommodation portion 120a. In the embodiment, the spring sheet 123 is formed of a spring steel with a thickness of 0.5 mm.

The three pressure-side assist cam portions 120b are portions that slide along the hub-side assist cam portions 114b of the clutch hub 114 as illustrated in FIG. 4A. The pressure-side assist cam portion 120b has an inclined surface gradually protruding toward the clutch hub 114 (the left-hand side of the illustration) along the direction of the circumference of the pressure plate 120. In other words, the hub-side assist cam portion 114b and the pressure-side assist cam portion 120b form an assist mechanism. The assist force generated by the assist mechanism is used to enable the use of the clutch spring 122 with a lower capacity (modulus of elasticity).

On the other hand, the three pressure-side slipper cam portions 120c are portions that slide along the hub-side slipper cam portions 114c as illustrated in FIG. 4B. The pressure-side slipper cam portions 120c are formed on the opposite side in the circumferential direction from the pressure-side assist cam portions 120b. The pressure-side slipper cam portion 120c has an inclined surface extending in the same direction as the pressure-side assist cam portion 120b. In other words, the hub-side slipper cam portions 114c and the pressure-side slipper cam portions 120c form a slipper mechanism.

The pressure plate 120 is attached by three mounting bolts 124 to the clutch hub 114. Specifically, the pressure plate 120 is fixed by clamping the mounting bolt 124 to the tubular support column 114a via a stopper member 125 while the tubular support column 114a of the clutch hub 114, the spring sheet 123, and the clutch spring 122 are placed in the tubular accommodation portion 120a. In this case, the stopper member 125 is a metal member for regulating the amount of displacement of the pressure plate 120 in a direction away from the clutch hub 114. The stopper member 125 is formed into a substantially triangular shape in plan view. Consequently, the pressure plate 120 is attached to the clutch hub 114 so as to be displaceable in directions closer to and away from the clutch hub 114.

A predetermined amount of clutch oil (not illustrated) is filled in the clutch 110. The clutch oil is supplied mainly between the friction plates 113 and the clutch plates 118 to absorb frictional heat generated between them and to suppress the wear of a wear material. In other words, the clutch 110 is what is called a wet multiple plate friction clutch.

The transmission 130 illustrated in FIG. 1 is a machine including a plurality of gear stages (for example, four gear stages). The transmission 130 changes the rotational driving force generated from the engine 80 by a selected gear stage to transmit the rotational driving force to the drive wheel 90. As illustrated in FIG. 1, the main shaft 115 is connected to the crankshaft 84 of the engine 80 via the clutch 110. A countershaft 131 extends parallel to the main shaft 115 and is connected to the drive wheel 90. The transmission 130 has a plurality of gear trains provided between the main shaft 115 and the countershaft 131. The plurality of gear trains forms the plurality of gear stages whose gear ratios are different from each other.

The plurality of gear trains provided between the main shaft 115 and the countershaft 131 each include a drive-side gear 132 provided to the main shaft 115 and a driven-side gear 133 provided to the countershaft 131. The drive-side gear 132 and the driven-side gear 133, which face each other, of each gear train are paired and always engaged with each other. In this case, shift forks 134 are inserted into parts of the drive-side gears 132 and the driven-side gears 133. The shift forks 134 slidingly displace the drive-side gears 132 and the driven-side gears 133 above the main shaft 115 and above the countershaft 131, respectively. Consequently, a dog clutch system causes the drive-side gears 132 to be coupled and separated and causes the driven-side gears 133 to be coupled and separated. In this manner, gear stages are selected (formed).

The shift fork 134 is a fork-shaped component for pressing and sliding the slidingly displaceable drive-side gear 132 and driven-side gear 133 in the direction of the axis to select one gear stage. The shift fork 134 is supported by a shift drum 135. The shift drum 135 is a columnar component for displacing the shift fork 134 reciprocatingly along the main shaft 115 and the countershaft 131. The shift drum 135 is rotationally driven by a shift actuator 136.

The shift actuator 136 is a motor for rotationally driving the shift drum 135 to select one gear stage including the drive-side gears 132 and the driven-side gears 133 in accordance with the angle of rotation of the shift drum 135. The shift actuator 136 includes an electric motor whose operation is controlled by the ECU 140. In this case, the ECU 140 controls the operation of the shift actuator 136 by the PWM control.

The drive-side gear 132 of the main shaft 115 and the driven-side gear 133 of the countershaft 131 are directly engaged with each other. In FIG. 1, for the purpose of description of the configuration, the shift drum 135 is intentionally illustrated between the main shaft 115 and the countershaft 131. In addition, the driven-side gears 133 and the drive-side gears 132 are illustrated separated from each other. Moreover, in the embodiment, the transmission 130 includes five gear stages of the first to fourth gear stages and neutral.

The ECU 140 (Engine Control Unit) is configured of a microcomputer including a CPU, ROM, and RAM. The ECU 140 controls the overall operation of the entire vehicle including the operation of the vehicle power transmission system 100 in accordance with a control program (not illustrated) prestored in the ROM or the like. The ECU 140 is connected to various sensors for acquiring information to be used to control the operation of the vehicle power transmission system 100. These sensors are provided to, for example, the engine 80 and the power transmission device 101.

Specifically, the ECU 140 is connected to a rotational speed sensor 150, a vehicle speed sensor 151, a shift actuator sensor 152, a shift position sensor 153, a clutch actuator sensor 154, and a throttle opening degree sensor 155. In this case, the rotational speed sensor 150 detects the rotational speed of the engine 80 based on the rotational speed of the crankshaft 84. Moreover, the vehicle speed sensor 151 detects the vehicle speed of the two-wheeled motor vehicle according to the embodiment based on the rotational speed of the drive wheel 90 being a rear wheel.

Moreover, the shift actuator sensor 152 detects the driving amount of the shift actuator 136 based on the angle of rotation of the shift actuator 136. Moreover, the shift position sensor 153 detects a selected gear stage in the transmission 130. Moreover, the clutch actuator sensor 154 detects the driving amount of the clutch actuator 117 based on the angle of rotation of the clutch actuator 117. Moreover, the throttle opening degree sensor 155 detects the degree of opening of the throttle valve 87.

Therefore, the ECU 140 controls the operation of the engine 80 and the power transmission device 101 based on detection signals from these various sensors. More specifically, the ECU 140 controls the operation of the ignition plug 82, the injector 88, the clutch actuator 117, and the shift actuator 136. Consequently, the ECU 140 executes control over combustion of the engine 80, control over engagement and disengagement of the clutch 110, and control over shift of a selected gear stage in the transmission 130 (upshifting and downshifting). In other words, the ECU 140 corresponds to an example of the control device according to the present disclosure.

(Operation of the Vehicle Power Transmission System 100)

Next, the operation of the vehicle power transmission system 100 configured as described above will be described. The vehicle power transmission system 100 is placed below a seat or fuel tank in the two-wheeled motor vehicle as described above. When the vehicle is travelling, or when the vehicle is halting temporarily in a state of being able to travel, the upshifting or downshifting control in accordance with the vehicle speed is automatically performed by the operation control by the ECU 140.

Upon a shift to the clutch ON state in the upshifting control, the ECU 140 performs control of shifting the clutch 110 to the clutch ON state. In the clutch ON state, the assist force generated by the hub-side assist cam portion 114b and the pressure-side assist cam portion 120b is suppressed. In this case, in the upshifting control by the ECU 140, the ECU 140 detects a start of the two-wheeled motor vehicle or the necessity of an upshift based on detection signals from the rotational speed sensor 150, the vehicle speed sensor 151, the shift actuator sensor 152, the shift position sensor 153, the clutch actuator sensor 154, and the throttle opening degree sensor 155. The ECU 140 automatically executes the upshifting control based on the detection results.

If the upshifting control is performed, the ECU 140 puts the clutch 110 in the clutch OFF state first. Specifically, the ECU 140 controls the operation of the clutch actuator 117 and slidingly displaces the push rod 116*b* toward the release bearing 121. Consequently, the release bearing 121 is pressed by the push member 116*a*. Consequently, in the clutch 110, the pressure plate 120 is separated from the friction plate 113. Hence, the friction plate 113 and the clutch plate 118 are separated. As a result, the clutch 110 enters the clutch OFF state where the driving force transmitted from the engine 80 to the transmission 130 is shut off. In other words, in order to put the clutch 110 in the clutch OFF state, the clutch actuator 117 presses the pressure plate 120 via the push rod 116*b*, the push member 116*a*, and the release bearing 121. The force of a press (the pressing force) is an example of the clutch OFF pressing force in the present disclosure.

In the process of putting the clutch 110 in the clutch OFF state, if the rotational speed of the main shaft 115 exceeds the rotational speed of the primary driven gear 112, a back torque acts on the clutch 110. Hence, the pressure-side slipper cam portion 120*c* formed on the pressure plate 120 rides onto the hub-side slipper cam portion 114*c* formed on the clutch hub 114 (refer to an arrow c) as illustrated in FIG. 4B. The cam operation of the hub-side slipper cam portion 114*c* and the pressure-side slipper cam portion 120*c* displaces the pressure plate 120 in the direction away from the clutch hub 114 (refer to an arrow d) while being rotationally displaced relative to the clutch hub 114. In this manner, a slipper function works which reduces the pressing force between the friction plate 113 and the clutch plate 118.

Next, the ECU 140 selects a gear stage in the transmission 130. Specifically, the ECU 140 controls the operation of the shift actuator 136 and rotationally displaces the shift drum 135. Accordingly, the ECU 140 causes the drive-side gear 132 and the driven-side gear 133 to mate with each other to select a gear stage (any of a first gear stage to a fourth gear stage) having a predetermined gear ratio in accordance with the vehicle speed.

Next, the ECU 140 puts the clutch 110 in the clutch ON state. Specifically, the ECU 140 controls the operation of the clutch actuator 117 and slidingly displaces the push rod 116*b* toward a side away from the release bearing 121 (the left-hand side of FIG. 2). In this case, the ECU 140 controls the amount of rotation of the clutch actuator 117 within a range in which the pressure plate 120 does not reach a position where the friction plate 113 and the clutch plate 118 come into close contact with each other to substantially shift the state to the clutch ON state. The ECU 140 then moves the push rod 116*b* backward (displaces the push rod 116*b* to the left-hand side of the illustration).

Moreover, the ECU 140 controls the amount of rotation of the clutch actuator 117 so as to make the clutch OFF pressing force applied to the pressure plate 120 less than the elastic force of the clutch spring 122. Consequently, the push rod 116*b* moves backward. Consequently, the clutch OFF pressing force applied to the pressure plate 120 is reduced. Accordingly, the pressure plate 120 is displaced by the elastic force of the clutch spring 122 toward the friction plate 113 and starts pressing the friction plate 113. As a result, the clutch 110 shifts from the clutch OFF state to the half clutch state.

Figure 5:
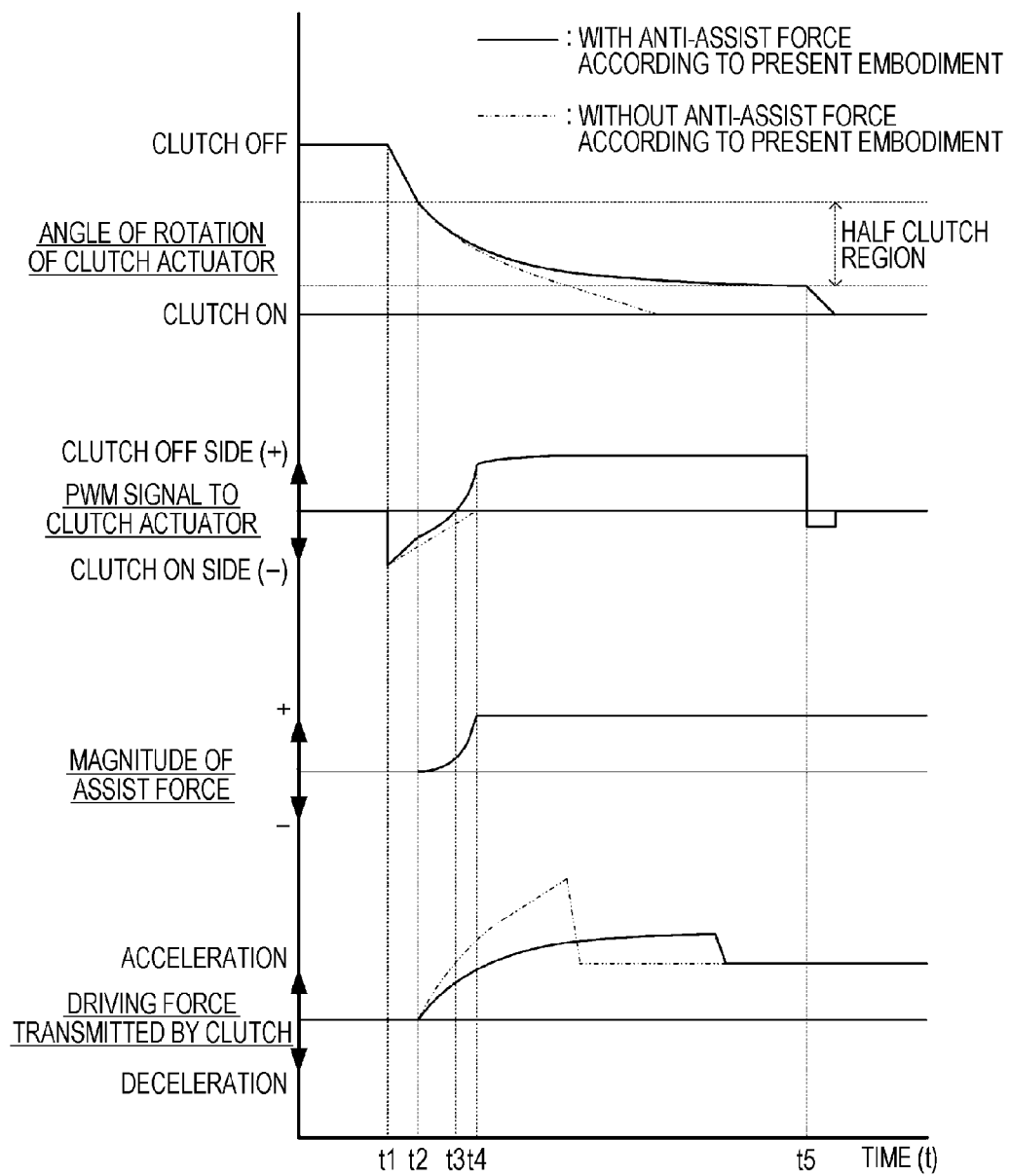
FIG. 5 is a time chart showing changes over time of the angle of rotation of a clutch actuator, a PWM signal to the clutch actuator, the magnitude of an assist force, and a driving force transmitted by the clutch, upon shifting the clutch to a clutch ON state in the vehicle power transmission system illustrated in FIG. 1.

If the clutch 110 is shifted from the clutch OFF state to the half clutch state, the ECU 140 outputs, to the clutch actuator 117, a PWM signal on the negative side for moving the push rod 116*b* backward as illustrated in FIG. 5. In the embodiment, the ECU 140 outputs a PWM signal corresponding to a large amount of displacement on the negative side (refer to t1). The ECU 140 subsequently outputs a PWM signal corresponding to the amount of displacement on the negative side that is reduced over time (refer to t2). In this case, the ECU 140 outputs a PWM signal to the clutch actuator 117 so as to locate the pressure plate 120 at a position where the friction plate 113 and the clutch plate 118 are in proximity to each other, the position allowing the clutch 110 to enter the half clutch state.

Moreover, in this case, the PWM signal corresponding to the amount of displacement on the negative side that is reduced over time displaces the pressure plate 120 at a lower speed than the speed of the displacement of the pressure plate 120 to be displaced by the assist force that is generated if the clutch 110 shifts to the half clutch state. On the other hand, the PWM signal corresponding to a large amount of displacement to the negative side displaces the pressure plate 120 at a higher speed than the speed of the displacement in accordance with the PWM signal corresponding to the amount of displacement on the negative side that is reduced over time. Consequently, the ECU 140 can shift the clutch 110 to the half clutch state early. Furthermore, the ECU 140 can smoothly start transmission of the driving force immediately after the clutch 110 shifts to the half clutch state.

Next, when the clutch 110 has shifted to the half clutch state (refer to t2), if the rotational speed of the primary driven gear 112 exceeds the rotational speed of the main shaft 115, the pressure-side assist cam portion 120*b* formed on the pressure plate 120 is drawn into the hub-side assist cam portion 114*b* formed on the clutch hub 114 (refer to an arrow a) as illustrated in FIG. 4A. The cam operation of the hub-side assist cam portion 114*b* and the pressure-side assist cam portion 120*b* displaces the pressure plate 120 in a direction closer to the clutch hub 114 (refer to an arrow b) while being rotationally displaced relative to the clutch hub 114. In this manner, an assist function works which generates the assist force. In this case, the assist force increases exponentially (refer to t2 to t4).

In this case, in the first half stage of the course of the assist force between after the assist force is generated and before the assist force reaches its maximum value (refer to t2 to t4), the assist force to be generated is relatively small. In the first half stage, the ECU 140 controls the operation of the clutch actuator 117 so that the force that moves the push rod 116*b* backward is gradually reduced over time with exponentially increasing assist force (refer to t2 to t3). Specifically, the ECU 140 outputs, to the clutch actuator 117, the PWM signal corresponding to the amount of displacement on the negative side that is reduced over time.

In other words, the ECU 140 controls the operation of the clutch actuator 117 so that the anti-assist force is applied to the pressure plate 120 in the first half stage (refer to t2 to t3) of the course of generation of the assist force. The anti-assist force is a force against the assist force generated in the pressure plate 120. In this case, the anti-assist force is a difference between a force of displacement of the pressure plate 120 to be displaced toward the clutch hub 114 side (that is, the negative side) and the assist force acting on the clutch hub 114 side. Therefore, the ECU 140 controls the operation of the clutch actuator 117 so that the pressure plate 120 is displaced at a lower speed than the pressure plate 120 to be displaced by the assist force. Consequently, the ECU 140 can generate the anti-assist force.

Consequently, the pressure plate 120 attempts to be displaced by the assist force toward the clutch hub 114. However, the displacement of the pressure plate 120 is blocked by the push rod 116*b*. Hence, the amount of the displacement of the pressure plate 120 is suppressed. As a result, the clutch 110 gradually transmits the driving force of the engine 80 to the transmission 130. In other words, sudden transmission of the driving force to the transmission 130 is suppressed. The resistance force from the clutch actuator 117 via the push rod 116*b*, which is a load on the displacement of the pressure plate 120, is an example of the anti-assist force of the present disclosure. In this case, the anti-assist force is a force less than the assist force that acts on the pressure plate 120.

Next, in the second half stage (refer to t3 to t4) of the course of generation of the assist force (refer to t2 to t4), the assist force significantly increases. In the second half stage (refer to t3 to t4), the ECU 140 controls the operation of the clutch actuator 117 so that the push rod 116*b* is moved forward instead of backward toward the release bearing 121. Specifically, the ECU 140 controls the operation of the clutch actuator 117 so that the push rod 116*b* is moved forward toward the release bearing 121 at a midpoint (refer to t3) in the course of generation of the assist force. In this case, the ECU 140 controls the operation of the clutch actuator 117 so that the force that is applied to move the pressure plate 120 forward, that is, the anti-assist force, becomes a force less than the assist force that acts on the pressure plate 120.

Moreover, in this case, the ECU 140 controls the operation of the clutch actuator 117 so that the anti-assist force exponentially increases with exponentially increasing assist force (refer to t3 to t4). Specifically, the ECU 140 outputs, to the clutch actuator 117, a PWM signal corresponding to the amount of displacement on the positive side that is increased over time.

Consequently, the pressure plate 120 attempts to be more strongly displaced by the assist force toward the clutch hub 114. However, the displacement of the pressure plate 120 is blocked by the anti-assist force acting on the push rod 116*b*. Hence, the amount of the displacement of the pressure plate 120 is suppressed. As a result, the clutch 110 gradually transmits the driving force of the engine 80 to the transmission 130. In other words, sudden transmission of the driving force to the transmission 130 is suppressed. Moreover, in the clutch 110, the anti-assist force increases with increasing assist force. Hence, the driving force transmitted to the transmission 130 increases at a constant rate. As a result, sudden transmission of the driving force to the transmission 130 can be suppressed. Moreover, in the clutch 110, the anti-assist force is less than the assist force. Hence, the clutch 110 shifts to the clutch ON state while the pressure plate 120 is gradually displaced toward the clutch hub 114.

Next, when the assist force has reached its maximum value (refer to t4), the ECU 140 controls the operation of the clutch actuator 117 so as to maintain the force that moves the push rod 116*b* forward constant while the clutch 110 is in the half clutch state. In the embodiment, the ECU 140 controls the operation of the clutch actuator 117 so as to maintain, as the maximum value, the anti-assist force at the time when the assist force has reached its maximum value. Specifically, the ECU 140 continues outputting, to the clutch actuator 117, a PWM signal corresponding to a constant amount of displacement on the positive side. Consequently, in the clutch 110, the pressure plate 120 is displaced toward the clutch hub 114 while being gradually pressed by the assist force. Consequently, the driving force of the engine 80 is gradually transmitted to the transmission 130. In other words, sudden transmission of the driving force to the transmission 130 is suppressed.

A period of time from when the push rod 116*b* is moved backward to when the push rod 116*b* is moved forward and the anti-assist force reaches its maximum value (refer to t1 to t4) is approximately 0.1 to 0.2 seconds. Moreover, the magnitude, application timing, time-varying changes, and application period of time of the anti-assist force to be applied to the pressure plate 120 may be controlled as follows. Information on the magnitude, generation timing, time-varying changes, and generation period of time of the assist force is measured in advance before the production of the clutch 110. Based on these pieces of information, it is possible to generate a PWM signal that controls the operation of the clutch actuator 117 and set (store) it in a storage device such as the ROM of the ECU 140.

Next, if the clutch 110 escapes from the half clutch state, the ECU 140 controls the operation of the clutch actuator 117 so as to interrupt the forward movement of the push rod 116*b*. In this case, the ECU 140 is required to control the operation of the clutch actuator 117 so as to move the push rod 116*b* backward once instead of forward, and then stop the displacement of the push rod 116*b* (refer to t5). Consequently, in the clutch 110, the pressure plate 120 is displaced toward the clutch hub 114 by the elastic force of the clutch spring 122. Hence, the friction plate 113 and the clutch plate 118 come fully into close contact with each other. Consequently, the clutch 110 shifts to the clutch ON state. As a result, the clutch 110 can transmit the driving force from the engine 80 to the gear stage newly selected in the transmission 130 and cause the two-wheeled motor vehicle to travel.

When the clutch 110 has substantially entered the clutch ON state around a boundary of escaping from the half clutch state, the rotational speed of the primary driven gear 112 becomes the same as the rotational speed of the main shaft 115. Hence, the driving force from the engine 80 transmitted from the clutch 110 to the transmission 130 is maintained at a constant value after decreasing slightly. Moreover, FIG. 5 shows the angle of rotation of the clutch actuator 117, the PWM signal to the clutch actuator 117, and the driving force to be transmitted by the clutch 110 in a case where the anti-assist force according to the embodiment is not applied to the pressure plate 120 by chain double-dashed lines. In this case, the PWM signal to the clutch actuator 117 in the case where the anti-assist force according to the embodiment is not applied to the pressure plate 120 is shown as a comparative example to the embodiment. The signal is a PWM signal when the pressure plate 120 is moved backward and then the amount of the backward movement of the pressure plate 120 is gradually reduced.

As understood from the operation description above, according to the embodiment, the vehicle power transmission system 100 includes the clutch actuator 117 and the ECU 140 that is the control device for controlling the operation of the clutch actuator 117. The clutch actuator 117 puts the clutch 110 in, for example, the clutch ON state being the state where the driving force is transmitted, the half clutch state, or the clutch OFF state being the state where the driving force is shut off. When, for example, the clutch 110 shifts from the clutch OFF state to the half clutch state, the ECU 140 controls the operation of the clutch actuator 117 and makes the clutch OFF pressing force applied to the pressure plate 120 less than the elastic force of the clutch spring 122. Furthermore, when, for example, the clutch 110 shifts to the clutch ON state before (immediately before) shifting to the half clutch state, the ECU 140 controls the operation of the clutch actuator 117 and applies, to the pressure plate 120, the anti-assist force against the assist force, the anti-assist force being less than the assist force. In this manner, the ECU 140 suppresses the increase of the assist force when the clutch 110 shifts from the clutch OFF state to the clutch ON state. Consequently, in the vehicle power transmission system 100, the clutch 110 shifts to the clutch ON state slowly and smoothly as compared to the known technology. Hence, the driver can drive the vehicle without feeling uncomfortable.

Furthermore, an embodiment of the present disclosure is not limited to the above embodiment. Various modifications can be made to the above embodiment without departing from the object of the technology of the present disclosure.

For example, in the vehicle power transmission system 100 in the above embodiment, the ECU 140 makes the speed of the displacement of the pressure plate 120 lower than the speed of the displacement of the pressure plate 120 displaced by the assist force that is generated upon a shift to the half clutch state, immediately before the clutch 110 enters the half clutch state. Consequently, the anti-assist force is applied to the pressure plate 120 from immediately before the clutch 110 shifts to the half clutch state. However, in the vehicle power transmission system 100, the ECU 140 can also be configured to apply the anti-assist force to the pressure plate 120 after the clutch 110 shifts to the half clutch state.

Moreover, in the above embodiment, the ECU 140 controls the operation of the clutch actuator 117 so as to apply the anti-assist force on the positive side to the pressure plate 120 at the midpoint in the course of generation of the assist force. However, the ECU 140 may control the operation of the clutch actuator 117 so as to apply the anti-assist force on the positive side to the pressure plate 120 before or after the midpoint in the course of generation of the assist force. Alternatively, the ECU 140 may control the operation of the clutch actuator 117 so as to apply the anti-assist force on the positive side to the pressure plate 120 before the generation of the assist force. Moreover, the ECU 140 may control the operation of the clutch actuator 117 so as to apply the anti-assist force on the negative side to the pressure plate 120 in the course of generation of the assist force.

The ECU 140 may control the operation of the clutch actuator 117 and apply the anti-assist force oriented toward the assist force to the pressure plate 120 after the assist force is generated and before the assist force reaches its maximum value. Furthermore, the ECU 140 may control the operation of the clutch actuator 117 and apply the anti-assist force to the pressure plate 120 at the midpoint between after the assist force is generated and before the assist force reaches its maximum value.

Moreover, in the above embodiment, the ECU 140 controls the operation of the clutch actuator 117 so as to increase the anti-assist force applied to the pressure plate 120 over time. However, the ECU 140 may control the operation of the clutch actuator 117 so as to maintain the anti-assist force applied to the pressure plate 120 constant over time.

Moreover, in the above embodiment, the ECU 140 controls the operation of the clutch actuator 117 so as to apply the anti-assist force to the pressure plate 120 until the clutch 110 shifts to the clutch ON state. However, the ECU 140 can also control the operation of the clutch actuator 117 so as to apply the anti-assist force to the pressure plate 120 also before the clutch 110 shifts to the clutch ON state (that is, in the half clutch state), or after the clutch 110 shifts to the clutch ON state.

Moreover, in the above embodiment, the ECU 140 controls the operation of the clutch actuator 117 so as to apply the anti-assist force to the pressure plate 120 triggered by one preset time-varying change when the clutch 110 is caused to shift to the clutch ON state. However, the ECU 140 can selectively apply a plurality of anti-assist forces that are different from each other to the pressure plate 120 according to the states of the rotational speed of the engine 80, the torque of the engine 80, the position of rotation of the clutch actuator 117, the selected gear stage in the transmission 130, the vehicle speed of the two-wheeled motor vehicle, or the like.

For example, the ECU 140 may prestore an anti-assist force selection table in a storage device such as the ROM. In this case, in the anti-assist force selection table, the states of the rotational speed of the engine 80, the torque of the engine 80, the position of rotation of the clutch actuator 117, the selected gear stage in the transmission 130, the vehicle speed of the two-wheeled motor vehicle, and the like are associated with a plurality of anti-assist forces. The ECU 140 then selects an optimum or associated anti-assist force from the anti-assist force selection table according to the states of the rotational speed of the engine 80, the torque of the engine 80, the position of rotation of the clutch actuator 117, the selected gear stage in the transmission 130, the vehicle speed of the two-wheeled motor vehicle, or the like. The ECU 140 controls the operation of the clutch actuator 117 so as to apply the selected anti-assist force to the pressure plate 120.

Moreover, in the above embodiment, the vehicle power transmission system 100 includes the clutch actuator 117 to move the main shaft 115 of the clutch 110 back and forth. Furthermore, the vehicle power transmission system 100 includes the shift actuator 136 to rotationally drive the shift drum 135 of the transmission 130. However, the vehicle power transmission system 100 can also drive the main shaft 115 of the clutch 110 and the shift drum 135 of the transmission 130 with one electric motor.

Moreover, in the above embodiment, the vehicle power transmission system 100 includes the clutch 110 having the assist mechanism and the slipper mechanism. However, the vehicle power transmission system 100 is simply required to include the clutch 110 having at least the assist mechanism. In other words, the clutch 110 may not have the slipper mechanism.

In the embodiment, the ECU 140 may output a PWM signal that has a large amount of displacement on the negative side (refer to t1 in FIG. 5), and then output a PWM signal with amount of displacement on the negative side reduced over time (refer to t2 in FIG. 5). Furthermore, the ECU 140 may output, to the clutch actuator 117, a PWM signal with amount of displacement on the positive side increased over time (refer to t3 to t4). Furthermore, the ECU 140 may continue outputting, to the clutch actuator 117, a PWM signal having a constant amount of displacement on the positive side (refer to t4 to t5).

Moreover, embodiments of the present disclosure may be the following first to sixth vehicle power transmission systems.

The first vehicle power transmission system includes: a transmission that transmits a driving force of an engine mounted in a vehicle to a drive wheel of the vehicle while changing the rotational speed; a clutch hub that holds a clutch plate placed facing a friction plate to be rotationally driven by the driving force transmitted from the engine, and that transmits the driving force to the transmission; and a clutch that includes a pressure plate, placed adjacently so as to be approachable to and separable from and relatively rotatable with respect to the clutch hub, for elastically pressing the friction plate or the clutch plate by a pressure elastic body, and that transmits or shuts off the driving force transmitted from the engine to or from the transmission. The clutch includes a hub-side assist cam portion and a pressure-side assist cam portion in the clutch hub and the pressure plate respectively, the hub-side assist cam portion and the pressure-side assist cam portion each including an inclined surface for generating an assist force that increases a pressing force between the friction plate and the clutch plate when a relative rotation is generated between the clutch hub and the pressure plate upon a shift to a state where the driving force of the engine is transmitted. The vehicle power transmission system includes a clutch actuator that applies, to the pressure plate, a clutch OFF pressing force that separates the pressure plate from the friction plate or the clutch plate against elastic force of the pressure elastic body to put the clutch in a state where the driving force is shut off, and a control device that controls operation of the clutch actuator and controls the transmission and shutting off of the driving force in the clutch. When causing the clutch to shift to the state where the driving force is transmitted, the control device controls the operation of the clutch actuator and applies, to the pressure plate, an anti-assist force that resists the assist force with a force less than the assist force while making the clutch OFF pressing force applied to the pressure plate less than the elastic force of the pressure elastic body, to suppress the increase of the assist force.

The second vehicle power transmission system is the first vehicle power transmission system. The control device controls the operation of the clutch actuator and applies the anti-assist force to the pressure plate before the clutch enters a half clutch state.

The third vehicle power transmission system is the first or second vehicle power transmission system. The control device controls the operation of the clutch actuator and applies, to the pressure plate, the anti-assist force oriented toward the assist force after the assist force is generated and before the assist force reaches its maximum value.

The fourth vehicle power transmission system is the third vehicle power transmission system. The control device controls the operation of the clutch actuator and applies the anti-assist force to the pressure plate at a midpoint between after the assist force is generated and before the assist force reaches its maximum value.

The fifth vehicle power transmission system is any one of the first to fourth vehicle power transmission systems. The control device controls the operation of the clutch actuator and increases the assist force applied to the pressure plate over time.

The sixth vehicle power transmission system is any one of the first to fifth vehicle power transmission systems. The control device controls the operation of the clutch actuator and continues applying the anti-assist force to the pressure plate until a shift to the clutch ON where the driving force is fully transmitted.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vehicle power transmission system comprising:
    a transmission for transmitting a driving force of an engine mounted in a vehicle to a drive wheel of the vehicle while changing a rotational speed;
    a clutch for transmitting or shutting off the driving force transmitted from the engine to or from the transmission, the clutch including: a clutch hub for holding a clutch plate placed facing a friction plate to be rotationally driven by the driving force transmitted from the engine and for transmitting the driving force to the transmission; and a pressure plate placed adjacently to the clutch hub so as to be approachable to and separable from and relatively rotatable with respect to the clutch hub, the pressure plate elastically pressing the friction plate or the clutch plate by a pressure elastic body;
    a hub-side assist cam portion and a pressure-side assist cam portion included in the clutch hub and the pressure plate of the clutch respectively, the hub-side assist cam portion and the pressure-side assist cam portion each including an inclined surface for generating an assist force to increase a pressing force between the friction plate and the clutch plate upon generation of a relative rotation between the clutch hub and the pressure plate when the clutch shifts to a state where the driving force is transmitted;
    a clutch actuator for applying, to the pressure plate, a clutch OFF pressing force to separate the pressure plate from the friction plate or the clutch plate against an elastic force of the pressure elastic body in order to put the clutch in a state where the driving force is shut off; and
    a control device for controlling operation of the clutch actuator and controlling the transmission and shutting off of the driving force in the clutch, the control device, when the clutch is caused to shift to the state where the driving force is transmitted, controlling the operation of the clutch actuator to make the clutch OFF pressing force to be applied to the pressure plate less than the elastic force of the pressure elastic body and apply, to the pressure plate, an anti-assist force being less than the assist force against the assist force, in order to suppress the increase of the assist force.

2. The vehicle power transmission system according to claim 1, wherein
    the control device controls the operation of the clutch actuator and applies the anti-assist force to the pressure plate before the clutch enters a half clutch state.

3. The vehicle power transmission system according to claim 1, wherein
    the control device controls the operation of the clutch actuator and applies, to the pressure plate, the anti-assist force oriented toward the assist force after the assist force is generated and before the assist force reaches its maximum value.

4. The vehicle power transmission system according to claim 2, wherein
    the control device controls the operation of the clutch actuator and applies, to the pressure plate, the anti-assist force oriented toward the assist force after the assist force is generated and before the assist force reaches its maximum value.

5. The vehicle power transmission system according to claim 3, wherein
    the control device controls the operation of the clutch actuator and applies the anti-assist force to the pressure plate at a midpoint between after the assist force is generated and before the assist force reaches its maximum value.

6. The vehicle power transmission system according to claim 4, wherein the control device controls the operation of the clutch actuator and applies the anti-assist force to the pressure plate at a midpoint between after the assist force is generated and before the assist force reaches its maximum value.

7. The vehicle power transmission system according to claim 1, wherein
the control device controls the operation of the clutch actuator and increases the anti-assist force applied to the pressure plate over time.

8. The vehicle power transmission system according to claim 1, wherein
the control device controls the operation of the clutch actuator and continues applying the anti-assist force to the pressure plate until the clutch shifts to a clutch ON state where the driving force is fully transmitted to the transmission.

* * * * *